Patented Feb. 10, 1953

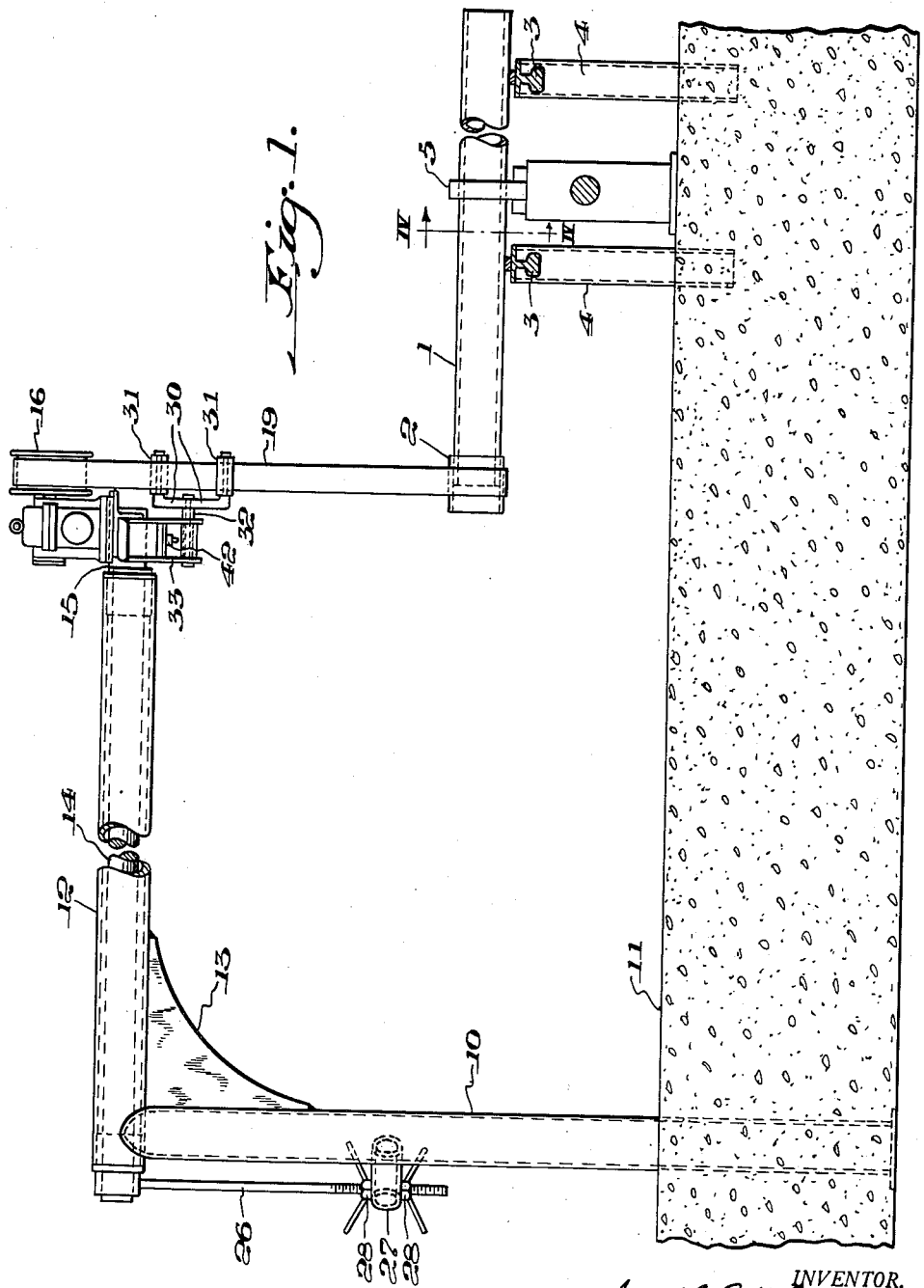

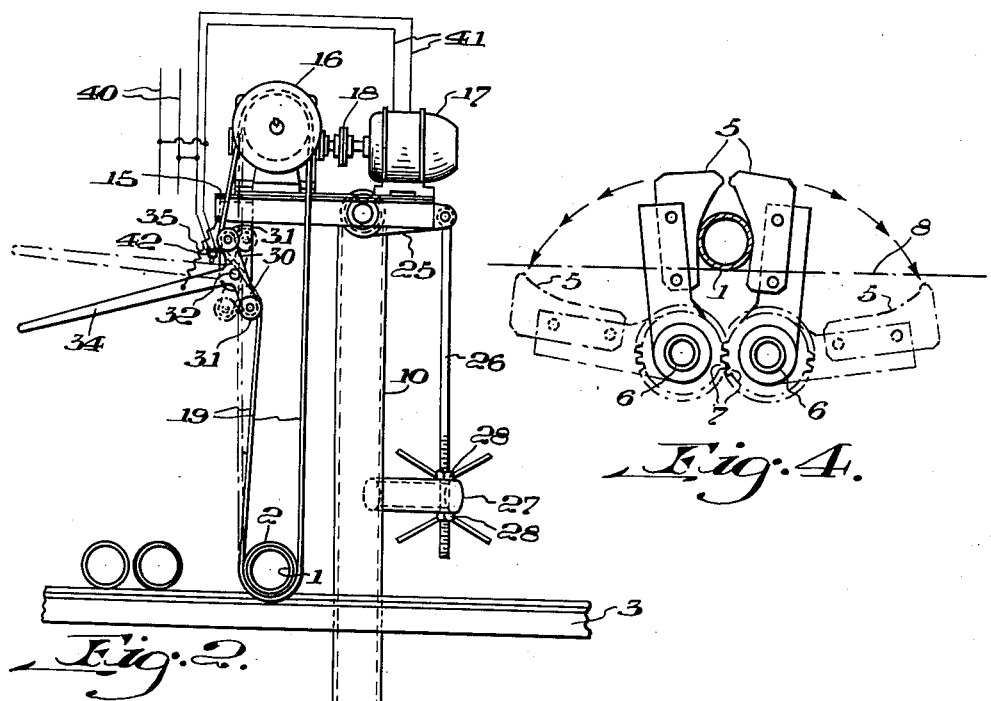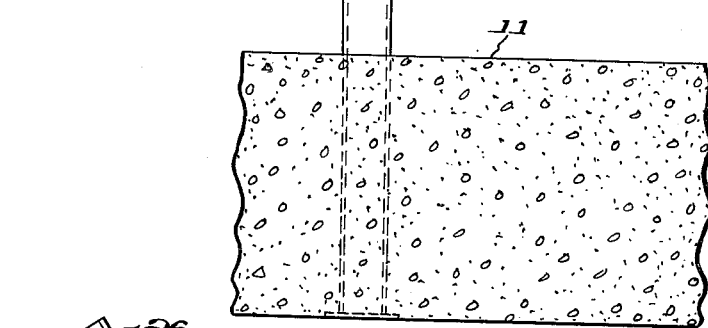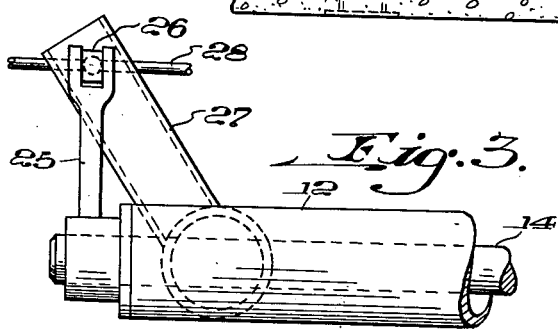

2,627,772

UNITED STATES PATENT OFFICE 2,627,772

APPARATUS FOR SCREWING PIPE COUPLINGS HAND-TIGHT ON PIPES

Joseph B. Wharton, Mars, Pa., assignor to The National Supply Company, Pittsburgh, Pa., a corporation of Pennsylvania Application August 31, 1950, Serial No. 182,541

6 Claims. (Cl. 81—57)

The invention relates to apparatus for screwing threaded pipe couplings hand-tight upon the ends of pipe.

In the manufacture of certain types of pipe, especially oil well casing, the prevailing practice is to apply a pipe coupling on one end of each pipe at the manufacturing plant so that in shipment, storage, etc., the pipe and attached coupling are handled as a unit. This is done in a three-step procedure, in the first of which a workman manually places a coupling on the threaded end of the pipe which is usually provided with a tapered thread. This permits the coupling to be telescopically applied to the pipe for some distance without rotating the coupling. Having thus placed a coupling on a pipe, the workman manipulates the coupling to bring its threads into mating relationship with those of the pipe, and then rotates the coupling a turn or two. Because both the pipe and coupling threads are previously coated with heavy grease, there is considerable resistance to this hand rotation of a coupling.

The next step in the procedure is to screw the coupling upon the pipe to a position commonly known as "hand-tight," which is done manually by a workman who engages the coupling by a suitable long-handled wrench of which there are various types. The coupling is so rotated a dozen or so turns, which requires considerable manual labor that is time-consuming and fatiguing, especially on the larger sizes of pipe. This hand-tightening of pipe couplings has been found to be a factor that limits production by the working crew of which the workman who screws the couplings to hand-tight position is a member. After a coupling has thus been screwed hand-tight upon a pipe, the assembled pipe and coupling is placed on a screw-on machine in which the coupling is further tightened upon the pipe by giving it about three turns, the screw-on machine being mechanically driven to apply a torque that may range up to 3000 ft. lbs. or more for the larger size pipe and couplings.

The object of the invention is to provide a simple and effective apparatus for mechanically screwing threaded couplings had-tight upon the ends of pipes to which the couplings have been preliminarily applied, the apparatus being adjustable for engaging and rotating couplings of different diameters upon pipes that are firmly supported on a table, and including an instrumentality for quickly and easily engaging a coupling for rotating it and for similarly releasing it.

The invention is illustrated in the accompanying drawings of which Fig. 1 is a side elevation of the preferred form of apparatus; Fig. 2 a right end view of the apparatus as shown in Fig. 1; Fig. 3 a plan view of the left end of the apparatus; and Fig. 4 a side view of a pair of pipe-gripping arms for firmly positioning a pipe upon a horizontal table, the arms being shown in full lines in pipe-engaging position, and in dotted lines in an open position below the plane of a supporting table.

The apparatus provided according to this invention comprises a pedestal which is equipped with an adjustable frame that supports a belt-driving pulley and a motor for driving it. The pedestal preferably comprises a vertical post and a horizontal arm at its top, and the adjustable frame preferably comprises a platform on which the belt-driving pulley and motor are mounted. This platform is preferably borne in a horizontally-disposed position by the outer end of a shaft that extends through the horizontal arm of the pedestal and which is rotatable pivotally to adjust the platform so that the lower end of a belt, whose upper end extends over the pulley, may readily be slipped over couplings of different diameters that are preliminarily applied to pipes. The apparatus also includes a belt tightener for tightening the belt after it has engaged a coupling, and provision is made, in the form of an electric switch that is actuated by the belt tightener, for closing a circuit through the pulley driving motor when the belt tightener is in belt-tightening position and for opening such circuit when the belt tightener is moved to slack belt position.

Having reference now to the illustrative embodiment of the invention, a pipe I having a coupling 2 preliminarily applied to one of its ends is shown as resting upon a horizontal table comprising rails 3 that are supported by posts 4. As seen in Fig. 2, the table is ordinarily supplied with a plurality of pipes which are successively rolled on the table to the position shown in Figs. 1 and 2 for engagement by the apparatus for screwing the coupling on the pipe. In that position, each pipe is firmly supported against rotation by a gripper of any desired construction, such as that partially illustrated in Fig. 4. As there shown, the gripper comprises a pair of pipe-gripping arms 5 that are attached at their lower ends to shafts 6 provided with inter-engaging pinions 7. Gripper arms 5 are shown in full lines in their upper position in which they engage a pipe I supported on the table rails 3 whose tops are indicated by the line 8, and are shown in dotted position below the level of the table so that pipes can be rolled over them.

The pedestal of the apparatus may take the form of a tubular post 10 whose lower end is anchored in a body of concrete 11, and a tubular horizontal arm 12 attached to the top of post 10 and braced by a bracket 13. Within the horizontal arm 12 there is rotatably mounted a shaft 14 whose ends extend beyond the ends of the arm. To the right end of shaft 14, as viewed in Fig. 1, there is attached a horizontally-disposed platform 15, one end of which supports a belt-driving pulley 16 and the other end a motor 17 having suitable driving and speed-reducing connections 18 to the pulley.

Provision is made for turning shaft 14 on its axis to raise or lower pulley 16 so that a belt 19 which it drives may readily be slipped over the end of couplings 2 of different diameters, varying from about three to about fourteen inches outside diameter. For this purpose the left end of shaft 14 as viewed in Fig. 1 has attached to it an arm 25, the outer end of which is pivotally connected to the upper end of a rod 26 whose lower threaded end extends through a tubular bracket 27 attached to and projecting outwardly from post 10. Wing nuts 28 on rod 26 above and below bracket 27, may be suitably turned to raise or lower rod 26 which, through arm 25, rotates shaft 14. This in turn raises or lowers the left end of platform 15, as viewed in Fig. 2, to raise or lower the lower end of belt 19. When the platform is thus adjusted to the desired position for making it possible manually to slip the lower end of the belt around couplings 2 of a particular size, the wing nuts may be tightened to hold the platform in that position so long as it is desired to screw couplings of such size hand-tight upon pipe.

A belt tightener is provided for tightening belt 19 after it has been slipped over a coupling, and for slackening the belt at the completion of a tightening operation. As shown in Figs. 1 and 2, the belt tightener comprises a pair of arms 30 provided at their ends with rollers 31 and attached between their ends to a short shaft 32 which is pivotally supported by the lower end of a bracket 33 suspended from platform 15. Attached to shaft 32 there is an operating lever 34 which may be pulled down by a workman to position the belt-engaging rollers 31 as shown in full lines in Fig. 2 to tighten belt 19 after its lower end has been slipped over a coupling 2. Operating lever 34 is yieldingly urged to its dotted line position by a suitable spring 35, the belt-engaging rollers 31 then being in the dotted position shown in Fig. 2 when the belt is slack.

Provision is made for automatically closing and opening an electric circuit through motor 17 by the movements of the belt tightener lever 34. As shown in Fig. 2, a supply circuit 40 is electrically connected to motor 17 through a circuit 41 which is opened and closed by a suitable electric switch 42 borne by bracket 33, the switch being of the conventional type that includes a movable circuit-controlling member which is yieldingly urged to circuit-closing position. The arrangement here is such that when operating lever 34 is moved to its upper dotted-line position by spring 35 it engages switch 42 to open circuit 41, and when the lever is moved downwardly by a workman the circuit-controlling member of switch 42 moves to close the circuit through the motor for driving belt pulley 16.

In the operation of the apparatus, a workman rolls a pipe 1 on table rails 3 to the position below belt pulley 16 shown in Fig. 2, and when in such position the pipe is engaged by gripper arms 5 as shown in Fig. 4, firmly to hold the pipe on the table against rotation. The workman then slips the lower end of belt 19 over the coupling 2 on the end of the pipe and pulls belt-tightener lever 34 downwardly to tighten the belt upon the outer surface of the coupling. This opens motor circuit 41 by the release of switch 42 so that motor 17 drives pulley 16 which in turn drives the tightened belt to rotate the coupling on the pipe to bring it to its hand-tight position. At the conclusion of this operation the workman releases lever 34 which is pulled upwardly by spring 35, so that the lever engages switch 42 to open the motor circuit. This operation may be quickly performed on pipes that are supported by the table rails in the manner generally shown in Fig. 2. When couplings are to be applied to larger or smaller diameter pipes, rock shaft 14 is turned the desired amount to lower or raise the lower end of pulley 19. This adjustment is effected by moving rod 26 upwardly or downwardly, respectively, through the manipulation of wing nuts 28. When the rod is moved upwardly it rotates shaft 14 counterclockwise, as viewed in Fig. 2, to lower the left side of platform 15. This lowers the belt 19 so that it may readily be applied to larger size couplings. The reverse of this adjustment is made for smaller size couplings. By the use of this apparatus, couplings may be economically hand-tightened upon pipe, without the slow and fatiguing manual labor that has heretofore been the prevailing practice.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. Apparatus for screwing threaded pipe couplings hand-tight upon the ends of pipe firmly supported in a horizontal position, comprising a pedestal having a vertical post and a horizontal arm at its top, a shaft rotatably mounted in and projecting beyond the outer end of said arm, a horizontally disposed frame rigidly attached to said shaft, a pulley for driving a suspended belt and a motor for driving the pulley borne by said frame, a lever attached to said shaft, a vertical rod connected to the outer end of said lever, and means borne by said pedestal post for adjusting said rod vertically to turn said shaft on its axis and thereby tilt said frame.

2. Apparatus for screwing threaded pipe couplings hand-tight upon the ends of pipe firmly supported in a horizontal position, comprising a pedestal equipped with an adjustable frame, a pulley for driving a suspended belt and a motor for driving the pulley borne by said frame, an electric circuit for supplying current to said motor, means for adjusting said frame to vary the vertical position of said pulley so that the belt driven thereby may be brought into engagement with pipe couplings of different diameters, a belt tightener movable to belt-tightening position after the belt has been brought into engagement with a pipe coupling, and means actuated by and upon said movement of the belt tightener to close said electric circuit.

3. Apparatus for screwing threaded pipe couplings hand-tight upon the ends of pipe firmly supported in a horizontal position, comprising a pedestal equipped with an adjustable frame, a pulley for driving a suspended belt and a motor for driving the pulley borne by said frame, an electric circuit for supplying current to said motor, means for adjusting said frame to vary the vertical position of said pulley so that the belt driven thereby may be brought into engagement with pipe couplings of different diameters, a belt tightener movable from a slack belt position to belt-tightening position after the slack belt has been brought into engagement with a pipe coupling, and an electric switch in said motor circuit positioned for actuation by said belt tightener whereby said circuit is closed when the tightener is moved to belt-tightening position and is opened when the tightener is moved to slack belt position.

4. Apparatus for screwing threaded pipe couplings hand-tight upon the ends of pipe firmly supported in a horizontal position, comprising a pedestal having a vertical post and a laterally-extending horizontal arm, a motor support movably borne by the outer end of said arm, a motor mounted on said support and equipped with a belt-driving pulley, a belt extending over and suspended from said pulley, and mechanism borne by said pedestal for moving said support and said motor and pulley mounted thereon variably to position said pulley in a vertical direction, whereby the lower end of said belt may freely be positioned around pipe couplings of different diameters applied to the ends of pipe to cause the belt when driven by said motor to screw a coupling hand-tight upon a pipe.

5. Apparatus for screwing threaded pipe couplings hand-tight upon the end of pipe firmly supported in a horizontal position, comprising a pedestal having a vertical post and a laterally-extending horizontal arm, a horizontally-disposed frame rockably borne on a horizontal axis by the outer end of said arm, a motor mounted on said frame and equipped with a belt-driving pulley, a belt suspended from said pulley, and mechanism borne by said pedestal for rocking said frame to vary the vertical position of said belt, whereby the lower end thereof may freely be positioned around pipe couplings of different diameters applied to the ends of pipe to cause said belt when driven by said motor to apply a coupling hand-tight upon a pipe.

6. Apparatus for screwing threaded pipe couplings hand-tight upon the ends of pipe firmly supported in a horizontal position, comprising a pedestal having a vertical post and a horizontal arm at its top, a shaft rotatably mounted in and projecting beyond the outer end of said arm, a horizontally disposed frame rigidly attached to said shaft, a pulley for driving a suspended belt and a motor for driving the pulley borne by said frame, and mechanism borne by said pedestal for rocking said shaft and said frame attached to it variably to position said pulley and belt whereby the lower end thereof may freely be positioned around pipe couplings of different diameters applied to the ends of pipe to cause said belt when driven by said motor to apply a coupling hand-tight upon a pipe.

JOSEPH B. WHARTON.

REFERENCES CITED

The following references are of record in the file of this patent:

UNITED STATES PATENTS

| Number | Name | Date |
| --- | --- | --- |
| 355,154 | Everett | Dec. 28, 1886 |
| 959,667 | White | May 31, 1910 |
| 1,027,339 | Johnson | May 21, 1912 |
| 1,455,345 | Mainin | May 15, 1923 |
| 1,760,167 | Palmer | May 27, 1930 |
| 1,763,135 | Cox | June 10, 1930 |
| 2,282,699 | Black | May 12, 1942 |
| 2,374,871 | Loveman | May 1, 1945 |
| 2,433,921 | Nelson | Jan. 6, 1948 |
| 2,460,671 | Benedick | Feb. 1, 1949 |
| 2,518,009 | Hess | Aug. 8, 1950 |